United States Patent
Bullough

(10) Patent No.: US 10,540,983 B2
(45) Date of Patent: Jan. 21, 2020

(54) DETECTING AND REDUCING FEEDBACK

(71) Applicant: Sorenson IP Holdings, LLC, Salt Lake City, UT (US)

(72) Inventor: Jeffrey Bullough, South Jordan, UT (US)

(73) Assignee: Sorenson IP Holdings, LLC, Salt Lake City, UT (US)

(*) Notice: Subject to any disclaimer, the term of this patent is extended or adjusted under 35 U.S.C. 154(b) by 108 days.

(21) Appl. No.: 15/611,441

(22) Filed: Jun. 1, 2017

(65) Prior Publication Data

US 2018/0350378 A1    Dec. 6, 2018

(51) Int. Cl.

| | | |
|---|---|---|
| G10L 21/02 | (2013.01) | |
| G10L 21/038 | (2013.01) | |
| G10L 15/02 | (2006.01) | |
| H04M 3/00 | (2006.01) | |
| H04M 1/76 | (2006.01) | |
| G10L 25/51 | (2013.01) | |
| G10L 21/0208 | (2013.01) | |
| H04R 3/02 | (2006.01) | |
| G10L 21/0232 | (2013.01) | |
| H04R 27/00 | (2006.01) | |
| H04M 3/42 | (2006.01) | |
| G10L 25/18 | (2013.01) | |

(52) U.S. Cl.
CPC .......... *G10L 21/0205* (2013.01); *G10L 15/02* (2013.01); *G10L 21/0208* (2013.01); *G10L 21/038* (2013.01); *G10L 25/51* (2013.01); *H04M 1/76* (2013.01); *H04M 3/002* (2013.01); *H04R 3/02* (2013.01); *G10L 21/0232* (2013.01); *G10L 25/18* (2013.01); *G10L 2015/025* (2013.01); *G10L 2021/02082* (2013.01); *H04M 3/42391* (2013.01); *H04R 27/00* (2013.01); *H04R 2430/03* (2013.01)

(58) Field of Classification Search
CPC .............. G10K 2210/3026; H04R 3/02; G10L 21/0208
USPC ................................ 381/83, 95, 96; 704/226
See application file for complete search history.

(56) References Cited

U.S. PATENT DOCUMENTS 5,822,370 A * 10/1998 Graupe ............... G10L 19/0204
                                                              375/240
8,085,943 B2    12/2011 Bizjak
(Continued)

FOREIGN PATENT DOCUMENTS

| CN | 102047693 A | 5/2011 |
|---|---|---|
| EP | 2237573 A1 | 6/2010 |

(Continued)

*Primary Examiner* — Jakieda R Jackson
(74) *Attorney, Agent, or Firm* — Maschoff Brennan

(57) ABSTRACT

A computer-implemented method to detect and reduce feedback in an audio signal is disclosed. The method may include obtaining an audio signal. The method may further include separating the audio signal into a plurality of frequency bands. The method may also include, for each frequency band of the plurality of frequency bands, determining whether the frequency band includes feedback. The method may further include, for each frequency band determined to include feedback, attenuating the frequency band. The method may also include combining each frequency band of the plurality of frequency bands to produce an output audio signal.

20 Claims, 9 Drawing Sheets

(56) References Cited

U.S. PATENT DOCUMENTS

| | | | |
|---|---|---|---|
| 2003/0055635 A1* | 3/2003 | Bizjak | H03G 3/3089 704/225 |
| 2003/0138117 A1 | 7/2003 | Goff | |
| 2005/0240401 A1* | 10/2005 | Ebenezer | G10L 21/0208 704/226 |
| 2006/0159282 A1 | 7/2006 | Borsch | |
| 2006/0215851 A1 | 9/2006 | Troxel | |
| 2011/0249847 A1 | 10/2011 | Salvetti et al. | |
| 2012/0057711 A1* | 3/2012 | Makino | G10L 21/0208 381/57 |
| 2014/0316774 A1* | 10/2014 | Wang | G10L 19/012 704/226 |
| 2015/0106088 A1* | 4/2015 | Jarvinen | G10L 21/0208 704/233 |
| 2017/0235404 A1* | 8/2017 | Grivna | G06F 3/0416 345/174 |

FOREIGN PATENT DOCUMENTS

| | | |
|---|---|---|
| GB | 2456296 A | 7/2009 |
| WO | 1991020134 A1 | 12/1991 |
| WO | 0152242 A1 | 7/2001 |
| WO | 2011006148 A1 | 1/2011 |
| WO | 2013007309 A1 | 1/2013 |
| WO | 2014094242 A1 | 6/2014 |

\* cited by examiner

DETECTING AND REDUCING FEEDBACK

FIELD

The embodiments discussed herein are related to detecting and reducing feedback.

BACKGROUND

Modern telecommunication services provide features to assist those who are deaf or hearing-impaired. One such feature is a text captioned telephone system for the hearing-impaired. A text captioned telephone system may include a telecommunication intermediary service that is intended to permit a hearing-impaired user to utilize a normal telephone network.

The subject matter claimed herein is not limited to embodiments that solve any disadvantages or that operate only in environments such as those described above. Rather, this background is only provided to illustrate one example technology area where some embodiments described herein may be practiced.

SUMMARY

A computer-implemented method to detect and reduce feedback in an audio signal is disclosed. The method may include obtaining an audio signal. The method may further include separating the audio signal into a plurality of frequency bands. The method may also include, for each frequency band of the plurality of frequency bands, determining whether the frequency band includes feedback. The method may further include, for each frequency band determined to include feedback, attenuating the frequency band. The method may also include combining each frequency band of the plurality of frequency bands to produce an output audio signal.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
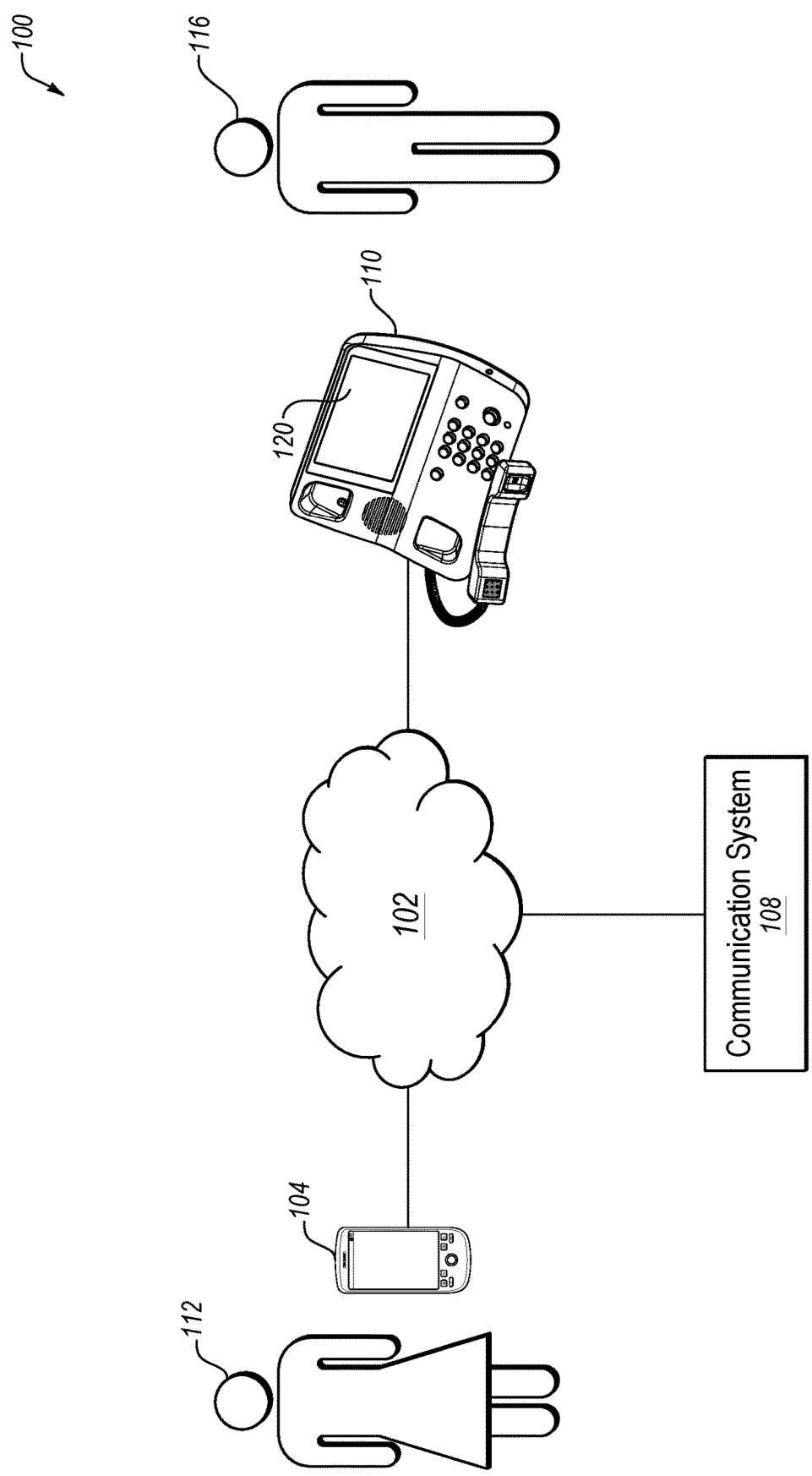
FIG. 1 illustrates an example environment that includes an example communication device that may detect and reduce feedback.

Some embodiments in this disclosure relate to a method and/or system that may detect and reduce feedback in an audio signal. For example, feedback may be caused by a positive feedback loop in a sound system. An audio output device, such as a loudspeaker, may output an audio signal. The audio signal may be detected by an audio input device, such as a microphone. The microphone may transmit the audio signal to an amplifier. The audio signal may be amplified, and the amplified audio signal may be output by a loudspeaker, which may output the audio signal at a higher magnitude (for example, louder). The process may repeat itself until the audio signal reaches very loud levels, becomes distorted, results in screeching, or results in other potentially undesirable outcomes.

In some embodiments, during a communication session, a device may receive and produce audio signals. In these and other embodiments, feedback may be present in the audio signals that the device receives. In some embodiments, feedback may be introduced into an audio signal as a result of interaction between a speaker and a microphone of the device as described above. Other feedback may occur based on signal reflections within receive and send paths of a device. For example, a signal transmitted by the device may be partially reflected at a duplexed output interface and be received again by the device on a receive path as feedback.

Some embodiments in this disclosure describe a device that may be configured to detect and reduce the feedback in an audio signal. For example, the device may separate the audio signal into multiple frequency bands. Each of the frequency bands may be examined to determine if there is feedback in the frequency band. In these and other embodiments, the audio signal in frequency bands determined to have feedback may be attenuated. For example, the audio signal in the frequency bands with feedback may be attenuated by a percentage amount or by an amount based on the amount of feedback in the frequency band.

In some embodiments, the presence of feedback may be determined for each of the multiple frequency bands individually. For example, in some embodiments, the presence of feedback may be determined when the magnitude of the audio signal in the frequency band is greater than a magnitude threshold for a period of time longer than a duration threshold. Alternatively or additionally, the presence of feedback may be determined when the magnitude of the audio signal in the frequency band is increasing for a period of time longer than a duration threshold.

In short, in some embodiments, the device may be configured so that feedback in an audio signal may be attenuated without attenuating frequencies of the audio signal that do not include feedback. As a result, the device may be configured to reduce situations where an audio signal becomes unpleasant or unintelligible because of feedback in the audio signal. For example, situations where the audio signal includes a screech or a very loud sound because of feedback may be avoided by the device detecting feedback in the audio signal and reducing the feedback.

In some embodiments, the systems and/or methods described in this disclosure may thus help to detect and reduce the amount of feedback in an audio signal. Thus, the systems and/or methods provide at least a technical solution to a technical problem associated with the design of user devices in the technology of telecommunications.

FIG. 1 illustrates an example environment 100 that includes an example system that may detect and reduce feedback in an audio signal. The environment 100 may be arranged in accordance with at least one embodiment described in the present disclosure. The environment 100 may include a network 102, a first communication device 104, a communication system 108, and a second communication device 110.

The network 102 may be configured to communicatively couple the first communication device 104, the communication system 108, and the second communication device 110. In some embodiments, the network 102 may be any network or configuration of networks configured to send and receive communications between systems and devices. In some embodiments, the network 102 may include a wired network or wireless network, and may have numerous different configurations. In some embodiments, the network 102 may also be coupled to or may include portions of a telecommunications network, including telephone lines such as a public switch telephone network (PSTN) line, for sending data in a variety of different communication protocols, such as a protocol used by a plain old telephone system (POTS).

Each of the first communication device 104 and the second communication device 110 may be any electronic or digital computing device. For example, each of the first communication device 104 and the second communication device 110 may include a desktop computer, a laptop computer, a smartphone, a mobile phone, a tablet computer, a telephone, a phone console, or any other computing device. In some embodiments, each of the first communication device 104 and the second communication device 110 may be configured to establish communication sessions with other devices. For example, each of the first communication device 104 and the second communication device 110 may be configured to establish an outgoing telephone call with another device over a telephone line or communication network. For example, the first communication device 104 may communicate over a wireless cellular network and the second communication device 110 may communicate over a PSTN line. Alternatively or additionally, the first communication device 104 and the second communication device 110 may communicate over other wired or wireless networks that do not include or only partially include a PSTN. For example, a telephone call or communication session between the first communication device 104 and the second communication device 110 may be a Voice over Internet Protocol (VoIP) telephone call. Alternately or additionally, each of the first communication device 104 and the second communication device 110 may be configured to communicate with other systems over a network, such as the network 102 or another network. In these and other embodiments, the first communication device 104 and the second communication device 110 may receive data from and send data to the communication system 108.

In some embodiments, the first communication device 104 and the second communication device 110 may each include memory and at least one processor, which are configured to perform operations as described in this disclosure, among other operations. In some embodiments, the first communication device 104 and the second communication device 110 may include computer-readable instructions that are configured to be executed by the first communication device 104 and the second communication device 110 to perform operations described in this disclosure.

In some embodiments, the second communication device 110 may be configured to detect and reduce feedback in an audio signal. In some embodiments, the audio signal may be obtained during a communication session, such as a voice or video call, between the first communication device 104 and the second communication device 110. In these and other embodiments, the audio signal may originate from the second communication device 110 or the first communication device 104. For example, the audio signal may be generated by a microphone of the second communication device 110. Alternatively or additionally, the audio signal may be an audio signal stored on the second communication device 110, such as recorded audio of a message from the user 112, a message from another user, audio books or other recordings, or other stored audio.

In some embodiments, the second communication device 110 may obtain the audio signal without the network 102. For example, in some embodiments, the audio signal may be generated from a microphone of the second communication device 110. Alternatively or additionally, in some embodiments, the audio signal may be obtained from an audio file on a computer-readable storage communicatively coupled with the second communication device 110. Alternatively or additionally, in some embodiments, the audio signal may be obtained from an analog or digital audio storage device such as an audio cassette, a gramophone record, or a compact disc. Alternatively or additionally, in some embodiments, the audio signal may be obtained from a video signal from an analog or a digital video storage device such as a video cassette or an optical disc. In these and other embodiments, the source of the audio signal may not be important. In these and other embodiments, the environment 100 may not include the network 102.

In some embodiments, the audio signal may include feedback. The feedback may be a result of a feedback loop. In some embodiments, the feedback loop may include an acoustic feedback loop between a microphone and a speaker. Alternatively or additionally, the feedback loop may include feedback from a line echo resulting from an echo or feedback of a transmitted signal in the network 102 connected to the second communication device 110. Alternatively or additionally, the feedback loop may include feedback from a hybrid echo from an impedance mix match in a connection between the second communication device 110 and the network 102. The feedback in the audio signal may also be the result of other types of feedback.

In these and other embodiments, the second communication device 110 may separate the audio signal into multiple frequency bands. In some embodiments, the second communication device 110 may separate the audio signal into frequency bands within the range normally audible to humans. For example, in these and other embodiments, the audio signal may be separated in frequency bands from the range of approximately 0.02 kilohertz (kHz) to approximately 20 kHz. In these and other embodiments, parts of the audio signal outside of this range may be ignored. For example, audio in the frequency range from 30 kHz to 40 kHz may not be analyzed as the frequency range may not be heard by humans.

In some embodiments, each of the multiple frequency bands may include an approximately equal bandwidth of frequency. For example, in some embodiments, each of the frequency bands may include 0.1 kHz of frequency, 0.5 kHz of frequency, 1 kHz of frequency, or any other bandwidth of frequency. Alternatively, in some embodiments, the audio signal may be separated into frequency bands where each frequency band includes a different bandwidth. For example, lower or higher frequency bands may include more frequency bandwidth. For example, the frequency bands may include frequency bandwidths in a logarithmic or other pattern. Alternatively, in some embodiments, one or more of the frequency bands may include different frequency bandwidths while other frequency bands include the same frequency bandwidths. For example, the lowest frequency bandwidth and the highest frequency bandwidth may include 0.5 kHz of frequency while the frequency bands between these two bands may each include 0.1 kHz of frequency.

In some embodiments, the second communication device 110 may determine whether any of the frequency bands include feedback. In these and other embodiments, the second communication device 110 may determine whether any of the frequency bands include feedback based on a comparison of the magnitude of the audio signal in each of the frequency bands with a magnitude threshold. In these and other embodiments, the magnitude of the audio signal in each of the frequency bands may be compared individually with the magnitude threshold. For example, the magnitude of the audio signal in a first frequency band may be compared with the magnitude threshold to determine if the first frequency band includes feedback. Separately, the magnitude of the audio signal in a second frequency band may be compared with the magnitude threshold to determine if the second frequency band includes feedback. The comparison of the magnitude of the audio signal in each of the frequency bands may not compare the magnitude of the audio signal in one frequency band with the magnitude of the audio signal in another frequency band. In these and other embodiments, when the magnitude of the audio signal is greater than the magnitude threshold for a duration of time longer than a duration threshold, the frequency band may be determined to include feedback. Alternatively or additionally, in some embodiments, when the magnitude of the audio signal is increasing for a duration of time longer than a duration threshold, the frequency band may be determined to include feedback.

In some embodiments, the magnitude thresholds and the duration thresholds may be determined using phonemes analysis of human speech. Alternatively or additionally, in some embodiments, the magnitude thresholds and the duration thresholds may also be based on one or more amplifications in the second communication device 110 and/or in the environment 100. In some embodiments, the magnitude threshold and the duration threshold may be different for different frequency bands. For example, human speech patterns may contain inflections in pitch, tone, and magnitude during the course of verbal communication. Human speech patterns may include different magnitudes and durations in different frequency bands. For example, speech in a first frequency band may typically have a first magnitude and a first duration while speech in a second frequency band may typically have a second magnitude and a second duration. A first magnitude threshold and a first duration threshold for the first frequency band may be based on the first magnitude and the first duration typical to the first frequency band. A second magnitude threshold and a second duration threshold for the second frequency band may be based on the second magnitude and the second duration typical to the second frequency band. Thus, the first magnitude threshold and the first duration threshold for the first frequency band may be different from the second magnitude threshold and the second duration threshold for the second frequency band. For example, during speech, the magnitude and frequency range for a human voice may vary over the course of 100 milliseconds or 200 milliseconds. However, feedback present in an audio signal may not vary in terms of magnitude or frequency over a duration of time of 100 milliseconds or 200 milliseconds. For example, the magnitude of an audio signal may be above the magnitude threshold for the duration of time. Alternatively, feedback in an audio signal may increase in volume over a duration of time such as 200 milliseconds. For example, as the feedback loop is repeated, the volume of the signal may increase over a duration of time.

The second communication device 110 may be configured to attenuate the audio signal of the frequency bands that are determined to include feedback. For example, in some embodiments, the second communication device 110 may attenuate the audio signal of a frequency band from a first point in time to a second point in time, where the audio signal has a magnitude greater than the magnitude threshold for a duration longer than the duration threshold between the first point in time and the second point in time. In these and other embodiments, the second communication device 110 may not attenuate the audio signal of the frequency band from a third point in time to a fourth point in time, where the audio signal does not have a magnitude greater than the magnitude threshold for a duration longer than the duration threshold between the third point in time and the fourth point in time. Frequency bands may be attenuated between some points in time and may not be attenuated between other points in time. Alternatively or additionally, some frequency bands may not be attenuated and some frequency bands may be attenuated between each point in time.

In some embodiments, the second communication device 110 may attenuate a frequency band with feedback by a fixed percentage amount of the audio signal. For example, in some embodiments, a frequency band with feedback may be attenuated by 1, 2, 5, 10, 15, 20, 25, 30, or 50 percent or any other percentage of the audio signal. Alternatively or additionally, in some embodiments, frequency bands with feedback may be attenuated by an amount based on the amount of feedback in the frequency band. The amount of feedback in a frequency band may be determined based on a difference between the magnitude of the audio signal in the frequency band and the magnitude threshold. For example, if the amount of feedback is below a first threshold, the audio signal may not be attenuated. If the amount of feedback is above a second threshold, the audio signal may be attenuated by a fixed percentage amount. If the amount of feedback is between the first threshold and the second threshold, the amount of attenuation may be determined by interpolating the amount of feedback between the first threshold and the second threshold. In some embodiments, the environment 100 may include a digital to analog converter (DAC). In these and other embodiments, a signal with feedback may saturate the range of the DAC. A magnitude threshold may be at or near the maximum range of the DAC. For example, a magnitude threshold for a 16 bit DAC may be at or near ±32,767. Alternatively or additionally, a magnitude threshold may be in units of decibels relative to a 0 decibel full scale.

In some embodiments, the first and second thresholds may be related to a long-term average of the input signal. In these and other embodiments, the long-term average may not include averaging the magnitude of the signal when feedback is detected in the signal. In some embodiments, thresholds may be 120%, 130%, 150%, 200%, 500%, or any other percentage or multiple of the long-term average. In some embodiments, the first threshold may be 120% of the long-term average and the second threshold may be 200% of the long-term average.

In some embodiments, the second communication device 110 may be configured to combine each frequency band, including the attenuated frequency bands, to produce an output audio signal.

An example of detecting and reducing feedback in an audio signal is now provided. An audio signal may be obtained by the second communication device. For example, in some embodiments, the audio signal may be at least partially obtained during a communication session with another communication device, such as the first communication device 104. In these and other embodiments, a call may be placed from the first communication device 104 to the second communication device 110. In response to receiving the call from the first communication device 104, a communication session between the first communication device 104 and the second communication device 110 may be established. During the communication session, the second communication device 110 may obtain an audio signal. The audio signal may be obtained from the first communication device 104 and/or from the second communication device 110.

The second communication device 110 may be configured to separate the audio signal into ten frequency bands. The frequency bands may be from 0 to 0.5 kHz, from 0.5 to 1 kHz, from 1 to 1.5 kHz, from 1.5 to 2 kHz, from 2 to 2.5 kHz, from 2.5 to 3 kHz, from 3 to 3.5 kHz, from 3.5 to 4 kHz, from 4 to 4.5 kHz, and from 4.5 to 5 kHz. Alternatively, the audio signal may be separated into other frequency bands.

The second communication device 110 may be configured to determine whether each frequency band from the ten frequency bands include feedback. The second communication device 110 may be configured to determine whether a frequency band includes feedback by determining if the frequency band has a magnitude greater than the magnitude threshold for a duration of time longer than a duration threshold. Alternatively, if the frequency band has a magnitude that is increasing for a duration of time longer than a duration threshold, the frequency band may be determined to include feedback.

For each frequency band determined to include feedback, the second communication device 110 may be configured to attenuate the audio signal of the frequency band during the duration of time the frequency band is determined to include feedback. For example, the frequency band from 1 kHz to 1.5 kHz may be determined to include feedback from 12.2 seconds to 12.9 seconds of the audio signal. The frequency band may be attenuated from 12.2 seconds to 12.9 seconds. The frequency band from 2.5 kHz to 3 kHz may be determined to include feedback from 4.3 seconds to 5.7 seconds and from 12.6 seconds to 13.8 seconds. The frequency band may be attenuated from 4.3 seconds to 5.7 seconds and from 12.6 seconds to 13.8 seconds. Other frequency bands may include feedback during different durations of time, may include feedback during overlapping durations of time, or may not include feedback.

The second communication device 110 may be configured to attenuate the audio signal in the frequency bands that include feedback by a fixed percentage. For example, the second communication device 110 may attenuate the frequency bands by 10%. Alternatively, the second communication device 110 may be configured to attenuate the audio signal in the frequency bands based on the amount of feedback in the frequency bands. After attenuating the frequency bands with feedback, the second communication device 110 may be configured to combine the frequency bands to generate an output audio signal.

The output audio signal may be output over a speaker and may be detected by a microphone, but feedback may not be present in the output audio signal or may be reduced.

In some embodiments, the communication system 108 may include any configuration of hardware, such as processors, servers, and data storages that are networked together and configured to perform a task. For example, the communication system 108 may include multiple computing systems, such as multiple servers that each include memory and at least one processor, which are networked together and configured to perform operations of detecting and reducing feedback in an audio signal, such as an audio signal obtained from another device, as described in this disclosure. The communication system 108 may perform similar functions as the second communication device 110 or the same functions as the second communication device 110 when detecting whether an audio signal includes feedback and in reducing feedback in an audio signal.

In some embodiments, the communication system 108 may also be configured to transcribe communication sessions, such as telephone or video calls, between devices such as the second communication device 110 and another device as described in this disclosure. In some embodiments, the presence of feedback in an audio signal may hinder the generation of transcriptions of communication sessions. In these and other embodiments, the communication system 108 may transcribe audio generated by other devices and not the second communication device 110 or both the second communication device 110 and other devices, among other configurations.

Further, in some embodiments, the environment 100 may be configured to facilitate an assisted communication session between a hearing-impaired user 116 and a second user, such as a user 112. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

In some embodiments, the second communication device 110 may be a captioning telephone that is configured to present transcriptions of the communication session to the hearing-impaired user 116, such as one of the CaptionCall® 57T model family or 67T model family of captioning telephones or a device running the CaptionCall® mobile app. For example, in some embodiments, the second communication device 110 may include a visual display 120 that is integral with the second communication device 110 and that is configured to present text transcriptions of a communication session to the hearing-impaired user 116.

During a captioning communication session, the communication system 108 and the second communication device 110 may be communicatively coupled using networking protocols. At the communication system 108, the audio signal may be transcribed. In some embodiments, to transcribe the audio signal, a call assistant may listen to the audio signal received from the stored audio message and "revoice" the words of the stored message to a speech recognition computer program tuned to the voice of the call assistant. In these and other embodiments, the call assistant may be an operator who serves as a human intermediary between the hearing-impaired user 116 and the stored message. In some embodiments, text transcriptions may be generated by a speech recognition computer as a transcription of the audio signal of the stored message. The text transcriptions may be provided to the second communication device 110 being used by the hearing-impaired user 116 over the one or more networks 102. The second communication device 110 may display the text transcriptions while the hearing-impaired user 116 listens to a message from the user 112. The text transcriptions may allow the hearing-impaired user 116 to supplement the voice signal received from the message and confirm his or her understanding of the words spoken in the message.

Modifications, additions, or omissions may be made to the environment 100 without departing from the scope of the present disclosure. For example, in some embodiments, the environment 100 may not include the communication system 108. Alternatively or additionally, in some embodiments, the environment 100 may not include the first communication device 104 or the network 102.

Figure 2A:
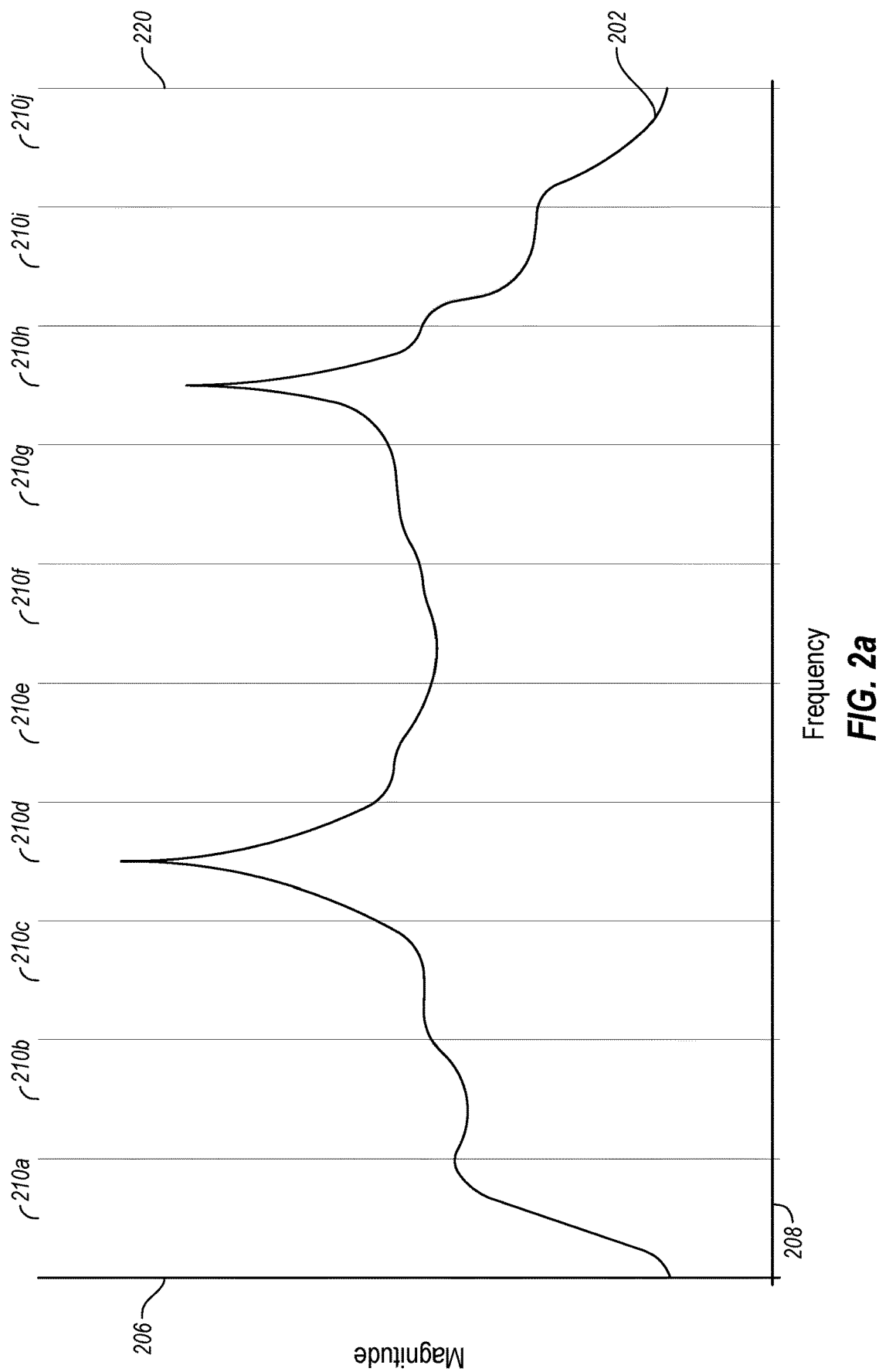
FIGS. 2a-2c are schematic diagrams illustrating an example audio signal separated into multiple frequency bands.
Figure 2B:
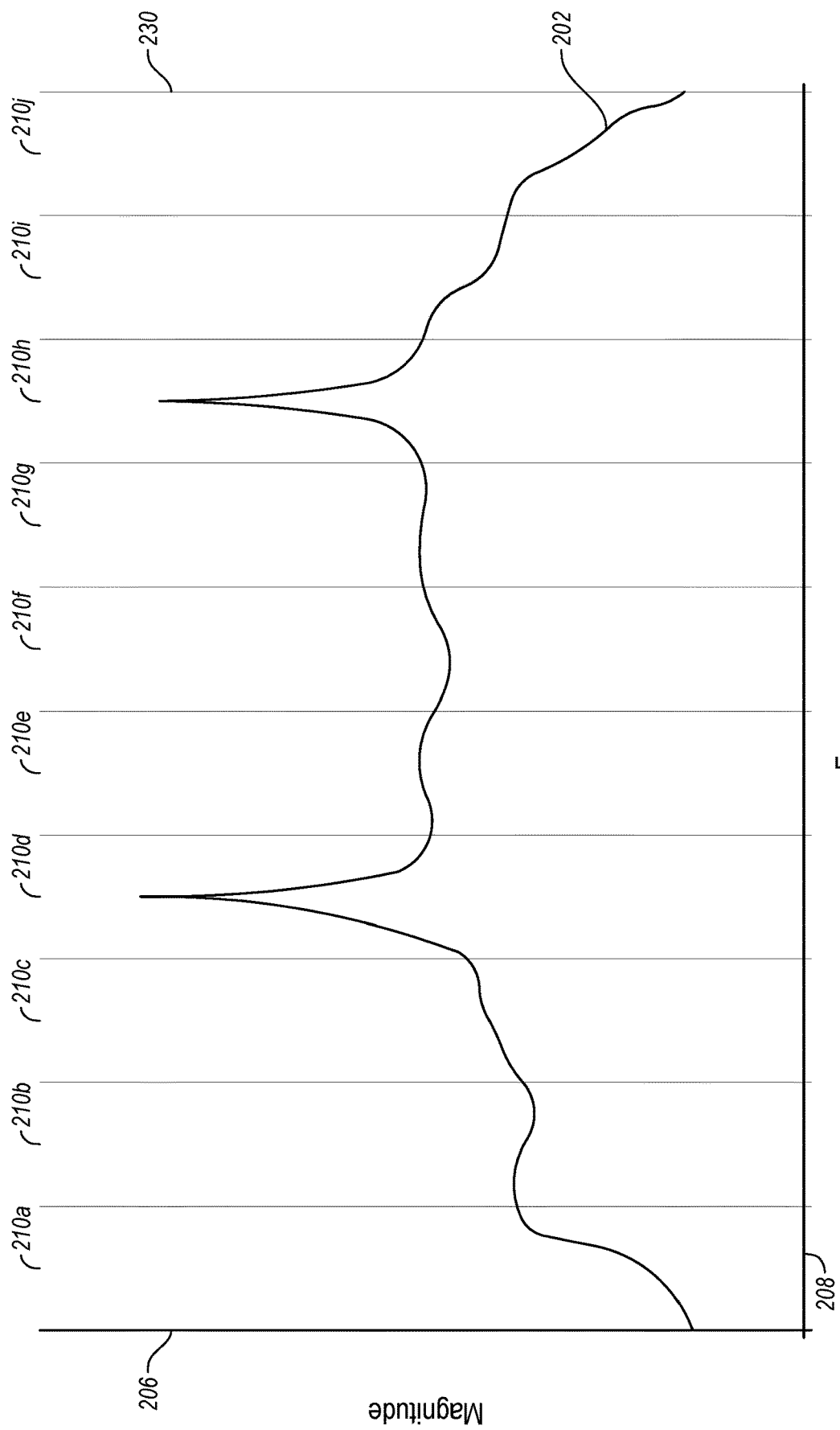
Figure 2C:
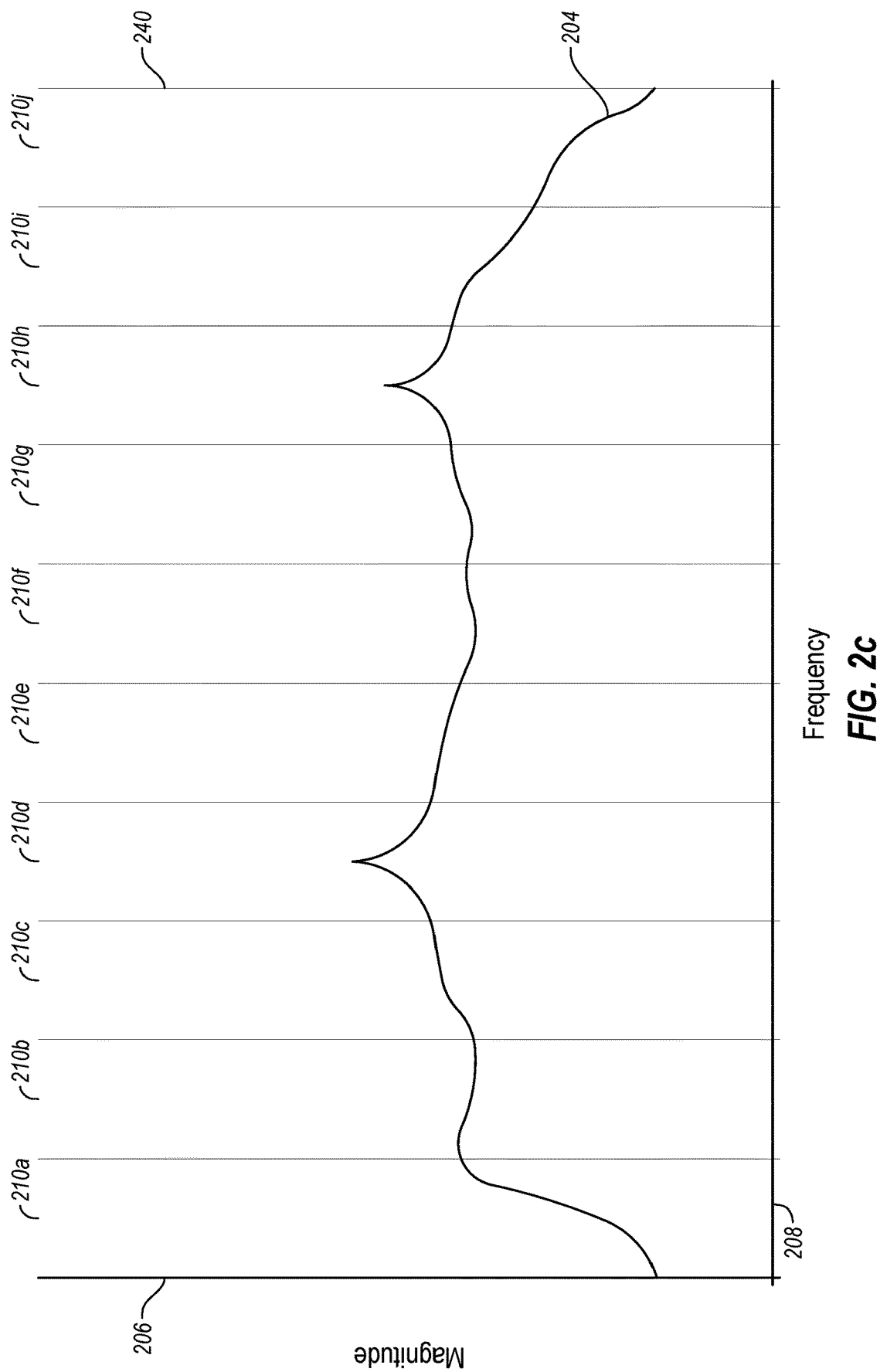

FIGS. 2a-2c illustrate schematic diagrams 220, 230, and 240 with an example audio signal 202 separated into multiple frequency bands. The schematic diagram 220 of FIG. 2a illustrates an audio signal 202 separated into ten frequency bands 210. The y-axis 206 of the schematic diagram 220 may represent a magnitude of the audio signal 202 at a particular frequency. In some embodiments, the magnitude of the audio signal 202 may be a normalized magnitude. The x-axis 208 of the schematic diagram 220 may represent a frequency of the audio signal 202. In some embodiments, the x-axis 208 may represent frequencies from 0 kHz to 20 kHz. Although depicted with ten frequency bands 210, in some embodiments, there may be more or fewer than ten frequency bands. Additionally, although the frequency bands 210 are depicted with approximately equal bandwidth of frequency, the frequency bands 210 may include different bandwidths of frequency. The schematic diagram 220 of FIG. 2a may represent the audio signal 202 at a first point in time. The schematic diagram 230 of FIG. 2b may represent the audio signal 202 at a second point in time. The schematic diagram 240 of FIG. 2c may represent an attenuated audio signal 204 after the audio signal 202 is attenuated.

In some embodiments, a communication device, such as the second communication device 110 of FIG. 1 may obtain the audio signal 202. In these and other embodiments, the audio signal 202 may be separated into ten frequency bands 210. The magnitude of the audio signal 202 may vary in each of the frequency bands 210. For example, as depicted in FIG. 2a, the magnitude of the audio signal 202 may generally increase from frequency band 210a to frequency band 210d. The magnitude of the audio signal 202 may remain generally constant from frequency band 210e to 210g. The magnitude of the audio signal 202 may peak again in frequency band 210h. The magnitude of the audio signal 202 may decline in frequency bands 210i and 210j.

The communication device may analyze each of the frequency bands 210 to determine if the frequency bands include feedback. In some embodiments, feedback may be determined to be included in a particular frequency band if the magnitude of the audio signal 202 inside the particular frequency band is greater than a magnitude threshold for a period of time greater than a duration threshold. Alternatively or additionally, in some embodiments, feedback may be determined to be included in a particular frequency band if the magnitude of the audio signal 202 inside the frequency band is increasing for a period of time greater than a duration threshold. In these and other embodiments, the duration threshold associated with the magnitude threshold may be different than the duration threshold associated with the increasing magnitude. In some embodiments, the magnitude threshold and the duration threshold may be different for different frequency bands.

The magnitude thresholds and the duration thresholds for different frequency bands may be determined through phonemes analysis of human speech. A phoneme may be a unit of sound in speech. Regular human speech in a particular language (e.g., English) may include phonemes of different magnitude, frequency, and duration. Phonemes in other languages may include different magnitudes, frequencies, and/or durations. By analyzing the phonemes of a particular language, relative magnitudes above which human speech does not normally rise for a particular frequency may be determined. Thus, magnitude thresholds may be determined for each frequency band for a particular language. Similarly, the duration thresholds may be based on the phonemes of a particular language. Each frequency band may have different duration thresholds. Additionally, the duration of typical increases in magnitude for a particular frequency band may be determined from phonemes analysis. In some embodiments, the magnitude thresholds may be determined based on amplification factors associated with the system.

In some embodiments, the presence of feedback in a frequency band may be determined by analyzing the rate at which envelopes of audio signal magnitudes change in frequency bands. In these and other embodiments, an envelope detector in each frequency band may look at multiple frames of the audio signal. A frame of the audio signal may be a duration of time less than the duration thresholds. For example, in some embodiments, the duration threshold may be 200 ms while a frame of the audio signal may be 100 ms. Alternatively, in some embodiments, the frames of the audio signal may have the same duration as the duration threshold. In some embodiments, multiple frames may be analyzed to determine if a frequency band includes feedback. For example, in some embodiments, the envelope detector may look at every frame, every other frame, every third frame, every fourth frame, or any other number of frames. For example, if the frame length is 50 ms and the duration threshold is 100 ms, three frames may be analyzed. For example, in some embodiments, the audio signal 202 may rise above the magnitude threshold in a first frame, remain above the magnitude threshold during the second frame, and remain above the magnitude threshold during the third frame. If, based on the envelope detector, the magnitude of the audio signal 202 is constant over a magnitude threshold for more than the duration threshold of 100 ms between the three frames, the frequency band may be determined to include feedback. As an additional example, the duration threshold may be 160 ms and the frame length may be 40 ms. If the magnitude of the audio signal 202 is greater than the magnitude threshold in a first frame, the envelope detector may also determine if the magnitude of the audio signal 202 is greater than the magnitude threshold in a fourth frame. If the magnitude of the audio signal 202 remains greater than the magnitude threshold in the fourth frame, the frequency band may be determined to include feedback because the duration of four frames (160 ms) is equal to the duration threshold (160 ms).

Alternatively or additionally, in some embodiments, if the magnitude of the audio signal 202 is increasing over a duration threshold, the frequency band may be determined to include feedback. For example, the duration threshold may be 300 ms. The frame length may be 100 ms. The magnitude of the audio signal 202 may increase during part of a first frame. The magnitude of the audio signal 202 may continue to increase during a second frame and a third frame. The magnitude of the audio signal 202 may also continue to increase during a part of a fourth frame. If the magnitude of the audio signal is increasing for a duration of time greater than the duration threshold of 300 ms between the four frames, the frequency band may be determined to include feedback. In some embodiments, if the magnitude of the audio signal 202 is greater than the magnitude threshold but the magnitude is decreasing, the frequency band may not be determined to include feedback.

The audio signal 202 may be determined to include feedback in frequency bands 210d and 210h between the first point in time and the second point in time as seen in FIGS. 2a and 2b. The audio signal 202 may be determined to not include feedback in the other frequency bands between the first point in time and the second point in time. Additionally, in some embodiments, the audio signal 202 may be determined to include feedback prior to the first point in time depicted in FIG. 2a and after the second point in time depicted in FIG. 2b.

The communication device may be configured to attenuate the audio signal 202 to produce the attenuated audio signal 204 depicted in FIG. 2c. In these and other embodiments, the attenuated audio signal 204 may be the audio signal 202 of FIGS. 2a and 2b with the audio signal 202 attenuated in frequency bands 210d and 210h determined to include feedback between the first point in time of FIG. 2a and the second point in time of FIG. 2b. For example, the audio signal 202 in frequency bands 210a, 210b, 210c, 210e, 210f, 210g, 210i, and 210j may not be attenuated for the attenuated audio signal 204. In these and other embodiments, the audio signal 202 may be attenuated in a similar manner as described above with respect to FIG. 1.

In some embodiments, the attenuation of the audio signal 202 in a frequency band may be performed iteratively. In these and other embodiments, the audio signal 202 may be attenuated in a step-down fashion. For example, the audio signal 202 may be attenuated by a fixed amount, e.g., 1, 5, 10, or any other amount of decibels. If, after the audio signal 202 is attenuated, the attenuated audio signal 202 includes feedback, additional attenuation may be performed on the attenuated audio signal 202. The attenuation may be performed in this step-down fashion until the frequency band no longer includes feedback. For example, the audio signal 202 may be attenuated by 5 decibels. After being attenuated by 5 decibels, the attenuated audio signal 202 may continue to include feedback. The audio signal 202 may again be attenuated by an additional 5 decibels. This process may continue until the attenuated audio signal 202 is determined to not include feedback. In these and other embodiments, the duration threshold for determining if the frequency band includes feedback may be decreased during the step-down process. For example, before attenuation, the duration threshold for a particular frequency band may be 200 ms. After the audio signal 202 has been attenuated by 5 decibels, the duration threshold for the particular frequency band may be reduced to 150 ms. After the audio signal 202 has been attenuated by another 5 decibels, the duration threshold may be reduced to 100 ms. In some embodiments, the step-down process may be followed by a gradual step-up process to gradually reduce the attenuation. For example, the audio signal 202 may be attenuated by 15 decibels. After being attenuated by 15 decibels, the attenuated audio signal 202 may no longer include feedback. The audio signal 202 may instead be attenuated by 10 decibels. If the audio signal 202 no longer includes feedback, the audio signal 202 may instead be attenuated by 5 decibels. This process may continue until the attenuated audio signal 202 is just determined to include feedback. This process may help reduce the magnitude the audio signal 202 is attenuated while still reducing feedback in the audio signal 202.

Modifications, additions, or omissions may be made to the schematic diagrams 220, 230, and 240 without departing from the scope of the present disclosure. For example, in some embodiments, the audio signal 202 may be separated into more or fewer frequency bands than ten. Alternatively or additionally, in some embodiments, the audio signal 202 may include feedback in more or fewer than two frequency bands. Alternatively or additionally, in some embodiments, the audio signal 202 may include feedback in some frequency bands 210 between a first point in time and a second point in time but not between a third point in time and a fourth point in time. Alternatively or additionally, in some embodiments, the audio signal 202 may be separated into frequency bands 210 between a frequency of 0 kHz and 5 kHz.

Figure 3:
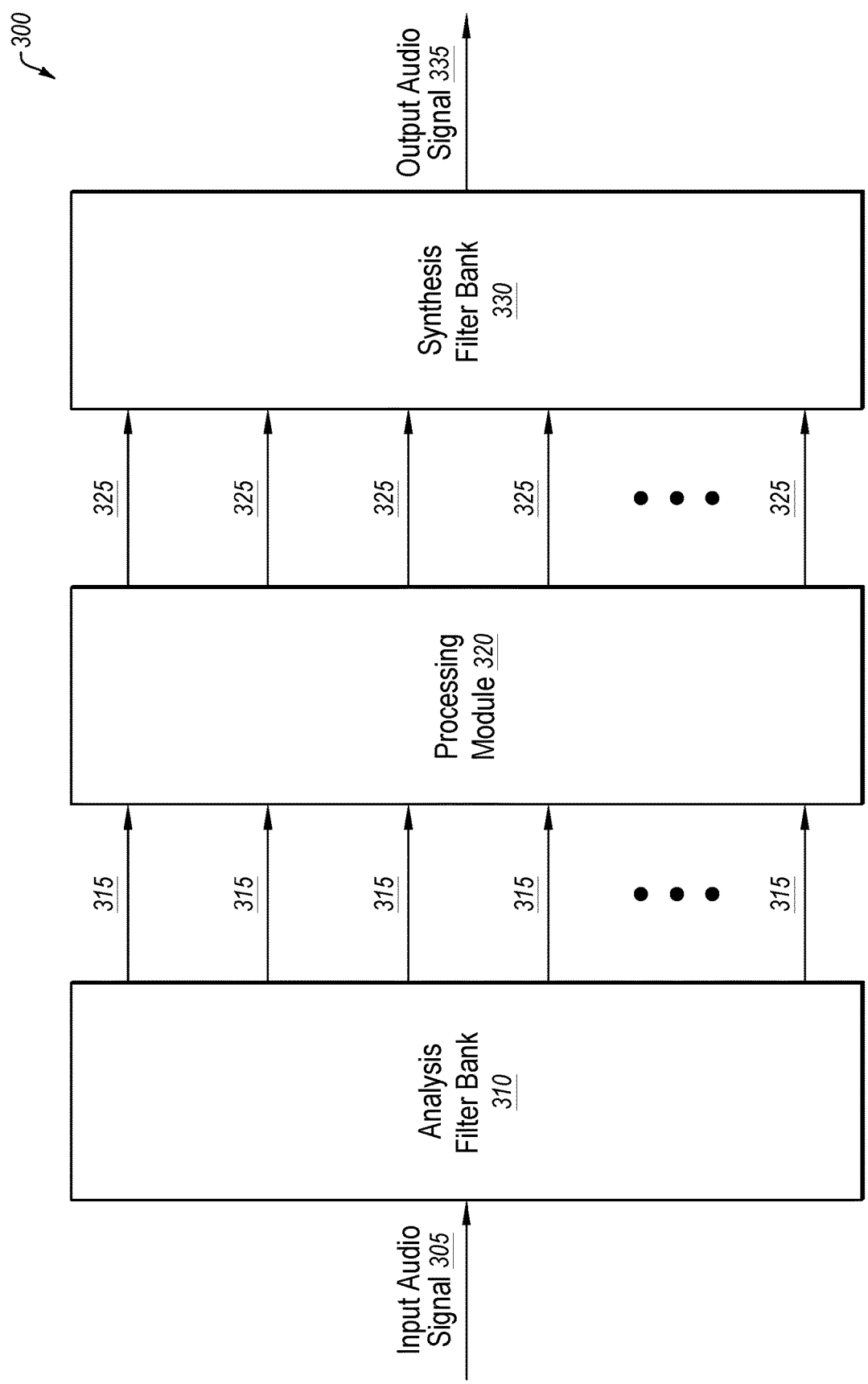
FIG. 3 illustrates an example frequency band processing system.

FIG. 3 illustrates an example frequency band processing system 300. The processing system 300 may be arranged in accordance with at least one embodiment described in the present disclosure. The processing system 300 may include an analysis filter bank 310, a processing module 320, and a synthesis filter bank 330, all of which may be communicatively coupled.

The analysis filter bank 310 and the synthesis filter bank 330 may each include an analog filter bank, a digital filter bank, a Fast Fourier Transform-based filter bank, a wavelet based filter bank, and/or other filter systems. In some embodiments, the analysis filter bank 310 and the synthesis filter bank 330 may include different types of filters. For example, in some embodiments, the analysis filter bank 310 may include an analog filter bank and the synthesis filter bank 330 may include a digital filter bank.

The analysis filter bank 310 may be configured to separate an input audio signal 305 into different frequency bands 315. In these and other embodiments, the analysis filter bank 310 may separate the input audio signal 305 into any number of frequency bands 315. In some embodiments, increasing the number of frequency bands 315 may increase the resolution of the detection and reduction of feedback in the input audio signal 305. For example, separating the input audio signal 305 into a greater number of frequency bands 315 may allow a greater proportion of the input audio signal 305 to pass through the processing module 320 without being attenuated.

In some embodiments, the analysis filter bank 310 may ignore frequencies of the input audio signal 305 outside of the range of normal human hearing. For example, in some embodiments, frequencies outside the range of 0.02 kHz to 20 kHz may be ignored. In these and other embodiments, the frequency bands 315 may include a subset of frequencies in the range of human hearing. For example, in some embodiments, the frequency bands 315 may include frequencies from 0 kHz to 5 kHz. Alternatively or additionally, in some embodiments, the analysis filter bank 310 may ignore frequencies of the input audio signal 305 outside of the range of normal human speech. For example, in some embodiments, frequencies outside the range of 0.08 kHz to 1 kHz may be ignored. Alternatively or additionally, in some embodiments, the frequency bands 315 may include frequencies from 0.3 kHz to 3 kHz.

The processing module 320 may be configured to detect and reduce feedback in the frequency bands 315 as described above with respect to FIGS. 1 and 2a-2c. In some embodiments, the processing module 320 may be configured to process a frame of input audio signal 305. For example, the processing module 320 may be configured to process 20 ms, 50 ms, 100 ms, 200 ms, or any other duration of time of the input audio signal 305 at a time. In some embodiments, the processing module 320 may be configured to attenuate frequency bands 315 that are determined to include feedback and to not attenuate frequency bands 315 that are determined to not include feedback. In these and other embodiments, the processing module 320 may provide processed frequency bands 325 to the synthesis filter bank 330. In these and other embodiments, a particular processed frequency band 325 may be unchanged from the associated frequency band 315.

For example, if a particular frequency band 315 is determined to not include feedback, the associated processed frequency band 325 may be unchanged from the particular frequency band 315. In these and other embodiments, at different points in time, none, some, or all of the frequency bands 315 may be processed to produce different processed frequency bands 325.

The synthesis filter bank 330 may be configured to combine the different processed frequency bands 325 into an output audio signal 335.

Figure 4:
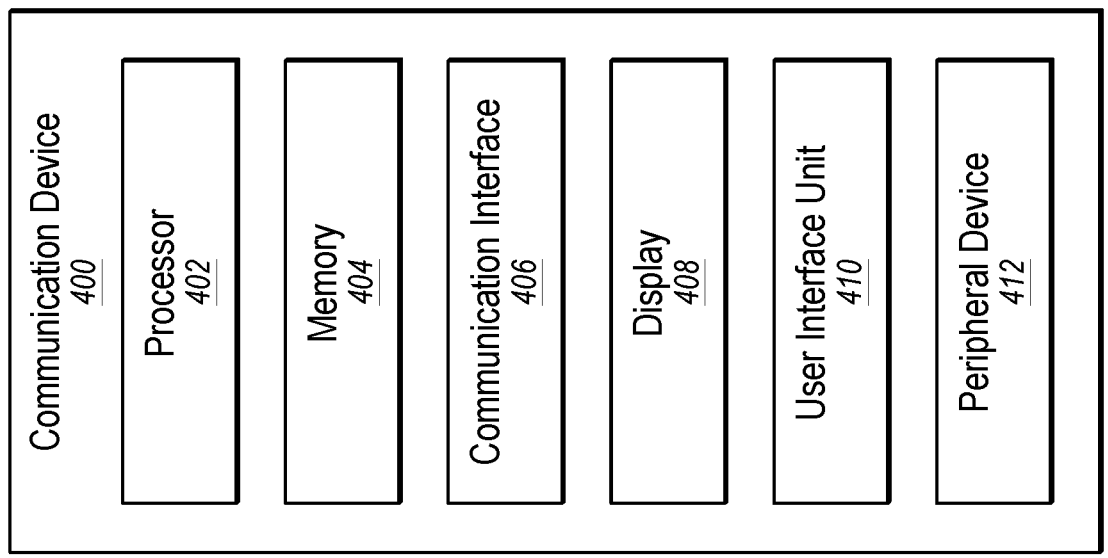
FIG. 4 illustrates an example communication device that may be used in detecting and reducing feedback.

FIG. 4 illustrates an example communication device 400 that may be used in detecting and reducing feedback in audio signals. The communication device 400 may be arranged in accordance with at least one embodiment described in the present disclosure. The communication device 400 may include a processor 402, a memory 404, a communication interface 406, a display 408, a user interface unit 410, and a peripheral device 412, which all may be communicatively coupled. In some embodiments, the communication device 400 may be part of any of the systems or devices described in this disclosure. For example, the communication device 400 may be part of any of the first communication device 104, the second communication device 110, or the communication system 108 of FIG. 1. In some embodiments, the communication device 400 may be part of a phone console.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof.

Although illustrated as a single processor in FIG. 4, it is understood that the processor 402 may include any number of processors distributed across any number of networks or physical locations that are configured to perform individually or collectively any number of operations described herein. In some embodiments, program instructions may be loaded into the memory 404. In these and other embodiments, the processor 402 may interpret and/or execute program instructions and/or process data stored in the memory 404. For example, the communication device 400 may be part of the first communication device 104, the second communication device 110, or the communication system 108 of FIG. 1. In these and other embodiments, the program instructions may include the processor 402 detecting and reducing feedback in an audio signal on the memory 404.

The memory 404 may include computer-readable storage media for carrying or having computer-executable instructions or data structures stored thereon. Such computer-readable storage media may be any available media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more blocks of the method 500 or the method 600. Additionally or alternatively, in some embodiments, the instructions may be configured to cause the processor 402 to perform the operations of the frequency band processing system 300 of FIG. 3. In these and other embodiments, the processor 402 may be configured to execute instructions to separate an audio signal into frequency bands. In these and other embodiments, the analysis filter bank 310 and/or the synthesis filter bank 330 of FIG. 3 may be implemented as a digital filter bank, which may be implemented as program code executed by the processor 402. Alternatively or additionally, in some embodiments, the frequency band processing system 300 of FIG. 3 may include an analog filter bank as the analysis filter bank 310 or the synthesis filter bank 330 of FIG. 3. In these and other embodiments, the communication device 400 may include one or more physical analog filter banks. In some embodiments, one of the analysis filter bank 310 and the synthesis filter bank 330 may be implemented as program code executed by the processor 402 and the other may be implemented as one or more analog filter banks.

The communication interface 406 may include any component, device, system, or combination thereof that is configured to transmit or receive information over a network. In some embodiments, the communication interface 406 may communicate with other devices at other locations, the same location, or even other components within the same system. For example, the communication interface 406 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), plain old telephone service (POTS), and/or the like. The communication interface 406 may permit data to be exchanged with a network and/or any other devices or systems described in the present disclosure.

The display 408 may be configured as one or more displays, like an LCD, LED, or other type display. The display 408 may be configured to present video, text captions, user interfaces, and other data as directed by the processor 402.

The user interface unit 410 may include any device to allow a user to interface with the communication device 400. For example, the user interface unit 410 may include a mouse, a track pad, a keyboard, a touchscreen, a telephone switch hook, a telephone keypad, volume controls, and/or other special purpose buttons, among other devices. The user interface unit 410 may receive input from a user and provide the input to the processor 402.

The peripheral devices 412 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may play audio received by the communication device 400 or otherwise generated by the communication device 400. In some embodiments, audio output by the speaker may be detected by the microphone. In these and other embodiments, the interaction of the speaker and the microphone may result in a positive feedback loop and may generate feedback in the audio signal. In these and other embodiments, the processor 402 may be configured to detect and reduce feedback in the audio signal, which may help reduce feedback in the audio output by the speaker.

Modifications, additions, or omissions may be made to the communication device 400 without departing from the scope of the present disclosure.

Figure 5:
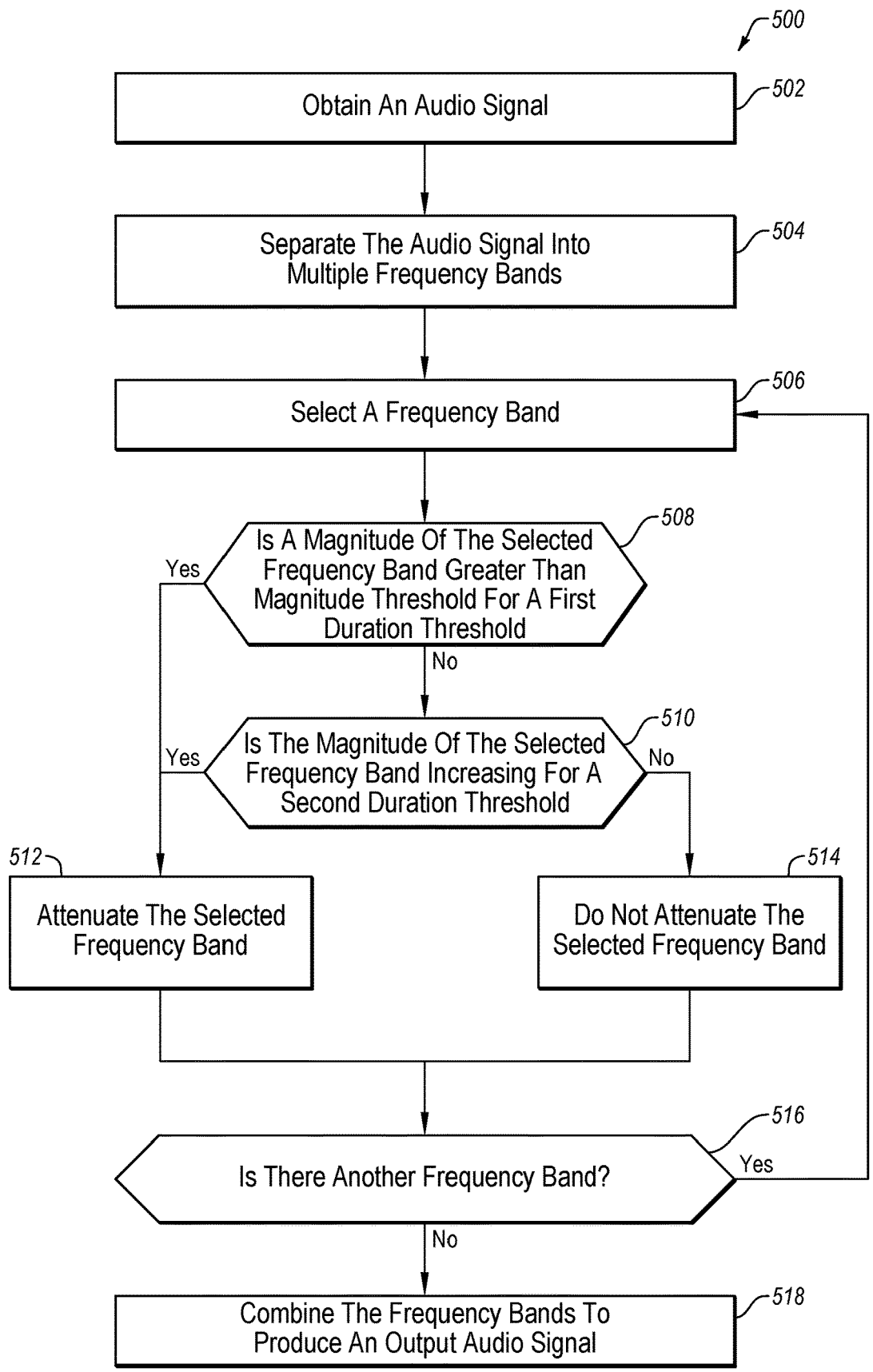
FIG. 5 illustrates an example process related to detecting and reducing feedback.

FIG. 5 illustrates an example process related to detecting and reducing feedback. The process 500 may be arranged in accordance with at least one embodiment described in the present disclosure. The process 500 may be performed, in whole or in part, in some embodiments, by a system and/or environment, such as the environment 100, the system 300, and/or the communication device 400 of FIGS. 1, 3, and 4, respectively. In these and other embodiments, the process 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The process 500 may begin at block 502, where an audio signal may be obtained. In block 504, the audio signal may be separated into multiple frequency bands. In some embodiments, each of the multiple frequency bands may include an approximately equal bandwidth of frequency. In some embodiments, one or more of the multiple frequency bands may include different bandwidths of frequency. In block 506, a frequency band may be selected.

In block 508, it may be determined if a magnitude of the selected frequency band is greater than a magnitude threshold for a first duration threshold. In some embodiments, the selected frequency band may be analyzed using frames of the audio signal. In some embodiments, the frames of the audio signal may be of shorter length than the first duration threshold. For example, in some embodiments, the first duration threshold may be 200 ms and the frames may be 100 ms. In these and other embodiments, multiple frames may be analyzed to determine if the magnitude of the selected frequency band is greater than the magnitude threshold for the first duration threshold. In some embodiments, the magnitude threshold and the first duration threshold may be based on the selected frequency band. In response to the magnitude of the selected frequency band being greater than the magnitude threshold for the first duration threshold ("Yes" at block 508), the process 500 may proceed to block 512. In response to the magnitude of the selected frequency band not being greater than the magnitude threshold for the first duration threshold ("No" at block 508), the process 500 may proceed to block 510.

In block 510, it may be determined if the magnitude of the selected frequency band is increasing for a second duration threshold. In response to the magnitude of the selected frequency band increasing for the second duration threshold ("Yes" at block 510), the process may proceed to block 512. In response to the magnitude of the selected frequency band not increasing for the second duration threshold ("No" at block 510), the process may proceed to block 514.

In block 512, the selected frequency band may be attenuated. In some embodiments, the selected frequency band may be attenuated from a first point in time to a second point in time, in response to the selected frequency band satisfying either the condition in block 508 or the condition in block 510 between the first point in time and the second point in time.

In some embodiments, the selected frequency band may be attenuated by a fixed percentage amount. In some embodiments, the selected frequency band may be attenuated by an amount of feedback in the selected frequency band. In these and other embodiments, the amount of feedback in the selected frequency band may be determined based on a difference between the magnitude of the selected frequency band and the magnitude threshold. In some embodiments, the selected frequency band may be attenuated by an amount calculated by interpolation of the magnitude of the selected frequency band between a second magnitude threshold and the magnitude threshold.

In block 514, the selected frequency band may not be attenuated. In block 516, it may be determined if there is another frequency band. In response to there being another frequency band ("Yes" at block 516), the process may return to block 506. In response to there not being another frequency band ("No" at block 516), the process may proceed to block 518. In block 518, the frequency bands may be combined to produce an output audio signal.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the blocks 506 through 516 for each frequency band may be performed as a parallel process. In these and other embodiments, multiple processors may perform the operations of blocks 506 through 516 for each of the frequency bands simultaneously. Additionally or alternatively, in some embodiments, the process 500 may not include block 508. In these and other embodiments, frequency bands of an audio signal may be attenuated based on the magnitude of the audio signal increasing but not based on the magnitude of the audio signal being above a magnitude threshold. Additionally or alternatively, in some embodiments, the process 500 may not include block 510. In these and other embodiments, frequency bands of an audio signal may be attenuated based on the magnitude of the audio signal being above a magnitude threshold but not based on the magnitude of the audio signal increasing.

Figure 6:
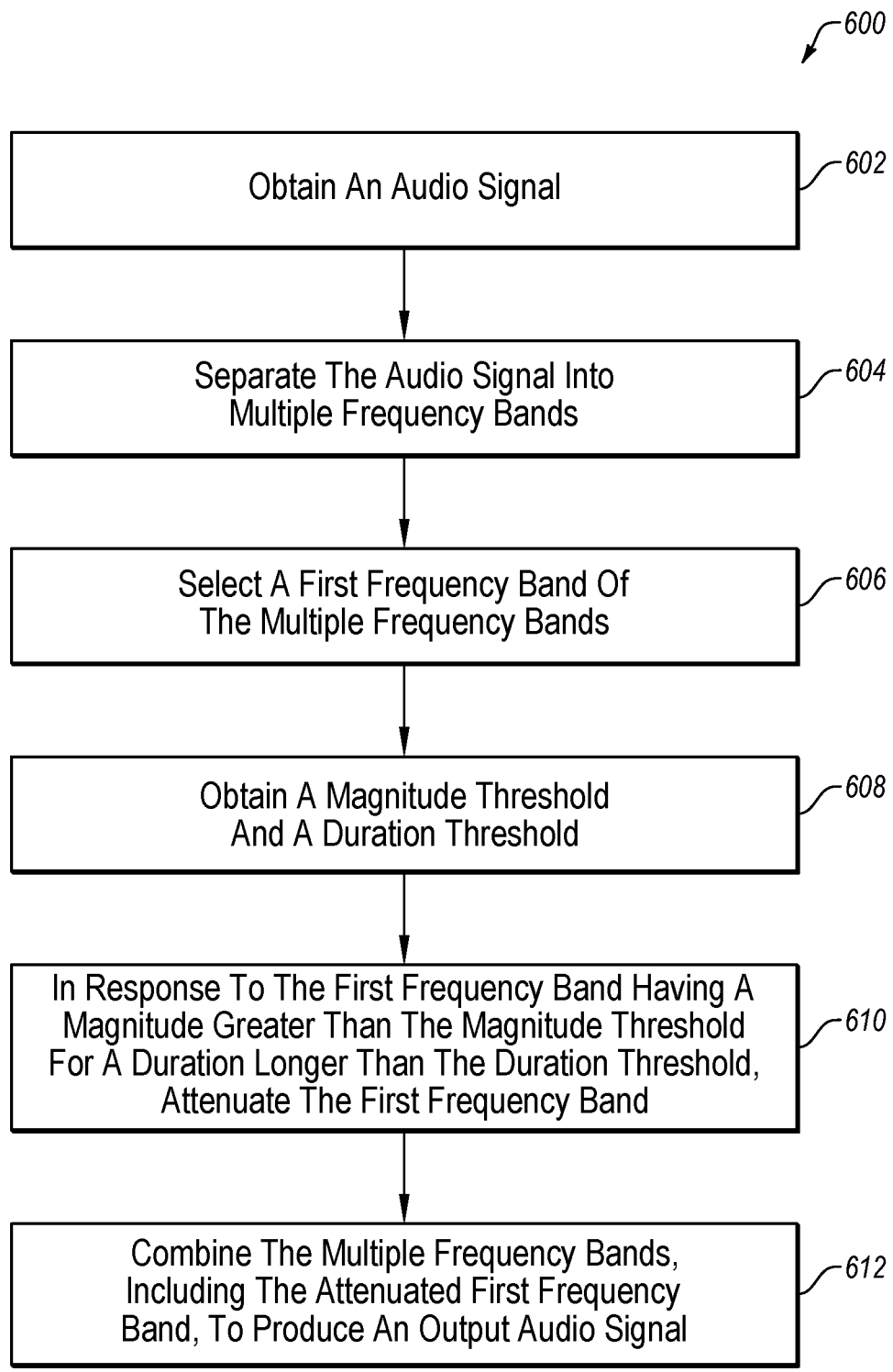
FIG. 6 is a flowchart of an example computer-implemented method to detect and reduce feedback.

FIG. 6 is a flowchart of an example computer-implemented method to detect and reduce feedback. The method 600 may be arranged in accordance with at least one embodiment described in the present disclosure. The method 600 may be performed, in whole or in part, in some embodiments, by a system and/or environment, such as the environment 100, the system 300, and/or the communication device 400 of FIGS. 1, 3, and 4, respectively. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 600 may begin at block 602, where an audio signal may be obtained. In block 604, the audio signal may be separated into multiple frequency bands. In some embodiments, each of the multiple frequency bands may include an approximately equal bandwidth of frequency. In block 606, a first frequency band of the multiple frequency bands may be selected. In block 608, a magnitude threshold and a duration threshold may be obtained. In some embodiments, the magnitude threshold and the duration threshold may be determined based on phonemes analysis of human speech.

In block 610, in response to the first frequency band having a magnitude greater than the magnitude threshold for a duration longer than the duration threshold, the first frequency band may be attenuated. In some embodiments, the first frequency band may be attenuated from a first point in time to a second point in time. In these and other embodiments, the first frequency band may have a magnitude greater than the magnitude threshold for a duration longer than the duration threshold between the first point in time and the second point in time. In some embodiments, the first frequency band may not be attenuated from a third point in time to a fourth point in time. In these and other embodiments, the first frequency band not having a magnitude greater than the magnitude threshold for a duration longer than the duration threshold between the third point in time and the fourth point in time.

In some embodiments, the first frequency band may be attenuated by a fixed percentage amount. In some embodiments, the first frequency band may be attenuated based on an amount of feedback in the first frequency band. In these and other embodiments, the amount of feedback determined may be based on a difference between the magnitude of the first frequency band and the magnitude threshold. In some embodiments, the first frequency band may be attenuated by an amount calculated by interpolation of the magnitude of the first frequency band between a second magnitude threshold and the magnitude threshold.

In block 612, the multiple frequency bands, including the attenuated first frequency band, may be combined to produce an output audio signal.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 7:
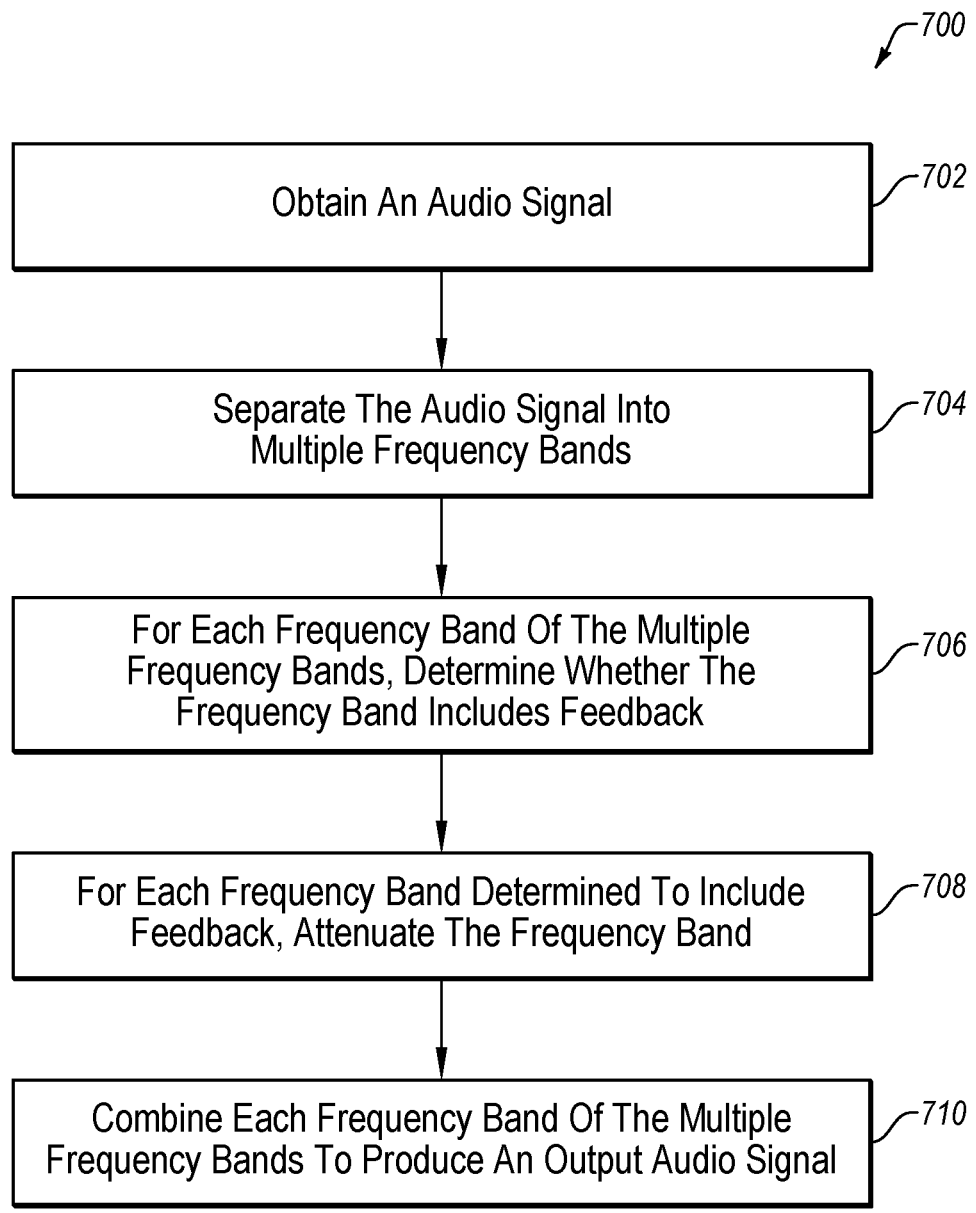
FIG. 7 is a flowchart of another example computer-implemented method to detect and reduce feedback.

FIG. 7 is a flowchart of an example computer-implemented method to detect and reduce feedback. The method 700 may be arranged in accordance with at least one embodiment described in the present disclosure. The method 700 may be performed, in whole or in part, in some embodiments, by a system and/or environment, such as the environment 100, the system 300, and/or the communication device 400 of FIGS. 1, 3 and 4, respectively. In these and other embodiments, the method 700 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 700 may begin at block 702, where an audio signal may be obtained. In block 704, the audio signal may be separated into multiple frequency bands. In some embodiments, each of the multiple frequency bands may include an approximately equal bandwidth of frequency. In some embodiments, one or more of the multiple frequency bands may include different bandwidths of frequency.

In block 706, for each frequency band of the multiple frequency bands, it may be determined whether the frequency band includes feedback. In some embodiments, the frequency band may be determined to include feedback in response to determining that a magnitude of the frequency band is constant above a magnitude threshold over a first duration threshold. In some embodiments, the magnitude threshold and the first duration threshold may be determined based on phonemes analysis of human speech. In some embodiments, the frequency band may be determined to include feedback in response to determining that the magnitude of the frequency band is increasing over a second duration threshold.

In block 708, for each frequency band determined to include feedback, the frequency band may be attenuated. In some embodiments, the frequency band may be attenuated by a fixed percentage amount. In some embodiments, the frequency band may be attenuated by an amount based on an amount of feedback in the frequency band. In these and other embodiments, the amount of feedback in the frequency band may be determined based on the magnitude of the frequency band and a first magnitude threshold. In some embodiments, the frequency band may be attenuated by an amount based on the interpolation of the magnitude of the frequency band between a second magnitude threshold and the magnitude threshold.

In block 710, each frequency band of the multiple frequency bands may be combined to produce an output audio signal.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 of FIG. 4) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A computer-implemented method to detect and reduce feedback in a signal, the method comprising:
   obtaining an audio signal;
   separating the audio signal into a plurality of frequency bands;
   selecting a first frequency band of the plurality of frequency bands;
   obtaining a magnitude threshold and a duration threshold;
   in response to the first frequency band having a magnitude greater than the magnitude threshold for a duration longer than the duration threshold, attenuating the first frequency band an amount of the attenuation determined based on a difference between the magnitude of the first frequency band and the magnitude threshold; and
   combining the plurality of frequency bands, including the attenuated first frequency band, to produce an output audio signal.

2. The method of claim 1, wherein attenuating the first frequency band comprises attenuating the first frequency band from a first point in time to a second point in time, the first frequency band having a magnitude greater than the magnitude threshold for a duration longer than the duration threshold between the first point in time and the second point in time, and not attenuating the first frequency band from a third point in time to a fourth point in time, the first frequency band not having a magnitude greater than the magnitude threshold for a duration longer than the duration threshold between the third point in time and the fourth point in time.

3. The method of claim 1, wherein each of the plurality of frequency bands includes an approximately equal bandwidth of frequency.

4. The method of claim 1, wherein the magnitude threshold and the duration threshold are determined based on phonemes analysis of human speech.

5. At least one non-transitory computer readable media configured to store one or more instructions that when executed by at least one system performs the method of claim 1.

6. The method of claim 1, further comprising:
   selecting a second frequency band of the plurality of frequency bands;
   obtaining a second magnitude threshold and a second duration threshold, both the second magnitude threshold and the second duration threshold based on the second frequency band, the second magnitude threshold being different than the magnitude threshold and the second duration threshold being different than the duration threshold; and in response to the second frequency band having a magnitude greater than the second magnitude threshold for a duration longer than the second duration threshold, attenuating the second frequency band, wherein the output audio signal includes the attenuated first frequency band and the attenuated second frequency band.

7. The method of claim 6, wherein the magnitude threshold and the duration threshold are determined based on phonemes analysis of human speech in the first frequency band and the second magnitude threshold and the second duration threshold are determined based on phonemes analysis of human speech in the second frequency band.

8. The method of claim 1, further comprising:
selecting a second frequency band of the plurality of frequency bands;
obtaining a second magnitude threshold based on the second frequency band, the second magnitude threshold being different than the magnitude threshold; and
in response to the second frequency band having a magnitude greater than the second magnitude threshold for a duration longer than the duration threshold, attenuating the second frequency band,
wherein the output audio signal includes the attenuated first frequency band and the attenuated second frequency band.

9. The method of claim 1, further comprising:
selecting a second frequency band of the plurality of frequency bands;
obtaining a second duration threshold based on the second frequency band, the second duration threshold being different than the duration threshold; and
in response to the second frequency band having a magnitude greater than the magnitude threshold for a duration longer than the second duration threshold, attenuating the second frequency band,
wherein the output audio signal includes the attenuated first frequency band and the attenuated second frequency band.

10. A computer-implemented method to detect and reduce feedback in a signal, the method comprising:
obtaining an audio signal;
separating the audio signal into a plurality of frequency bands;
for each frequency band of the plurality of frequency bands, determining whether the frequency band includes feedback in response to determining that a magnitude of the frequency band is increasing over a time period equal to a duration threshold;
for each frequency band determined to include feedback, attenuating the frequency band; and
combining each frequency band of the plurality of frequency bands to produce an output audio signal.

11. The method of claim 10, wherein for each frequency band of the plurality of frequency bands, determining whether the frequency band includes feedback is further in response to determining that the magnitude of the frequency band is above a magnitude threshold over a first duration threshold.

12. The method of claim 11, wherein the magnitude threshold and the first duration threshold are determined based on phonemes analysis of human speech.

13. The method of claim 10, wherein each of the plurality of frequency bands includes an approximately equal bandwidth of frequency.

14. The method of claim 10, wherein one or more of the plurality of frequency bands include different bandwidths of frequency.

15. The method of claim 10, wherein attenuating the frequency band comprises attenuating the frequency band by one of the following: a fixed percentage amount, an amount based on an amount of feedback in the frequency band, and the amount of feedback determined based on the magnitude of the frequency band and a first magnitude threshold.

16. At least one non-transitory computer readable media configured to store one or more instructions that when executed by at least one system performs the method of claim 10.

17. A system to detect and reduce feedback in a signal, the system comprising:
one or more processors, the one or more processors configured to:
obtain an audio signal;
separate the audio signal into a plurality of frequency bands;
select a first frequency band of the plurality of frequency bands;
obtain a magnitude threshold and a duration threshold;
in response to the first frequency band having a magnitude greater than the magnitude threshold for a duration longer than the duration threshold, attenuate the first frequency band, an amount of the attenuation determined based on a difference between the magnitude of the first frequency band and the magnitude threshold; and
combine the plurality of frequency bands, including the attenuated first frequency band, to produce an output audio signal.

18. The system of claim 17, wherein the magnitude threshold and the duration threshold are determined based on phonemes analysis of human speech.

19. The system of claim 17, wherein the first frequency band is attenuated in response to the first frequency band having a magnitude greater than the magnitude threshold for a duration longer than the duration threshold and determining that the magnitude of the first frequency band is increasing over a time period equal to a second duration threshold.

20. The system of claim 17, wherein each of the plurality of frequency bands includes an approximately equal bandwidth of frequency.

* * * * *